(12) United States Patent  
Ulrey et al.

(10) Patent No.: US 8,443,820 B2  
(45) Date of Patent: May 21, 2013

(54) FUEL DISTRIBUTION IN MULTI-FUEL TANK COMPRESSED GAS FUEL SYSTEMS

(75) Inventors: Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1022 days.

(21) Appl. No.: 12/477,317

(22) Filed: Jun. 3, 2009

(65) Prior Publication Data

US 2010/0307454 A1    Dec. 9, 2010

(51) Int. Cl.  
*F17D 1/00* (2006.01)

(52) U.S. Cl.  
USPC ....... 137/1; 137/263; 141/2; 141/18; 141/237

(58) Field of Classification Search .................. 137/263, 137/256, 1; 141/1, 2, 18, 237, 238  
See application file for complete search history.

(56) References Cited

U.S. PATENT DOCUMENTS

| | | | |
|---|---|---|---|
| 5,522,439 A * | 6/1996 | Hakansson et al. | 141/237 |
| 5,615,702 A | 4/1997 | Dawans et al. | |
| 6,708,718 B2 | 3/2004 | Yamada et al. | |
| 6,786,245 B1 * | 9/2004 | Eichelberger et al. | 141/18 |
| 7,246,606 B2 * | 7/2007 | Tokumaru et al. | 123/514 |
| 7,325,561 B2 | 2/2008 | Mathison et al. | |
| 2006/0246177 A1 | 11/2006 | Miki et al. | |
| 2007/0000563 A1 | 1/2007 | Handa | |
| 2009/0288426 A1 * | 11/2009 | Lilletvedt et al. | 62/50.2 |

* cited by examiner

*Primary Examiner* — Kevin Lee  
(74) *Attorney, Agent, or Firm* — Julia Voutyras; Alleman Hall McCoy Russell & Tuttle LLP

(57) ABSTRACT

A method for distributing fuel in a fuel system of a motor vehicle. The method may be applied in a fuel system having a first fuel tank, where fuel is confined at a first pressure, and a second fuel tank, where fuel is confined at a second pressure greater than the first pressure. The method comprises releasing fuel already resident in the second fuel tank to the first fuel tank, and admitting fuel to the first and second fuel tanks simultaneously.

20 Claims, 6 Drawing Sheets

FUEL DISTRIBUTION IN MULTI-FUEL TANK COMPRESSED GAS FUEL SYSTEMS

TECHNICAL FIELD

The present application relates to the field of fuel systems, and more particularly, to compressed-gas fuel systems for motor vehicles.

BACKGROUND AND SUMMARY

Compressed gasses such as hydrogen, methane, and natural gas (CNG) are suitable fuels for internal combustion engines. In some localities, gaseous fuels may be less expensive than gasoline or diesel fuel in terms of their cost per energy equivalent. Further, in contrast to liquid fuels, gaseous fuel may be more accurately controlled at or near stoichiometry during an engine start, as less excess fueling is used to achieve desired combustion performance. Moreover, some gaseous fuels may have higher octane ratings than liquid fuels.

A challenge for gaseous fuel systems in motor vehicles is the low and temperature-dependent volumetric energy density of compressed-gas fuels. One consequence is that the mechanical work needed to fill a compressed-gas fuel tank may be a significant fraction of the total internal energy stored in the fuel tank. Further, as the density of a gas at constant pressure decreases with increasing temperature, the very act of filling the fuel tank may, under some conditions, increase the temperature of the gas such that a fuel tank filled to a constant pressure contains less fuel mass than would be present if the fuel tank was filled to the same pressure at ambient temperature.

Various attempts to address these issues have appeared. For example, U.S. Patent Application Publication 2007/0000563 provides a system for increasing the overall efficiency of a high-pressure gas-fueled vehicle and refilling station infrastructure. In the disclosed system, the evolved heat from high-pressure refueling is absorbed by a melting/solidifying medium inside the fuel tank, and may be dispersed via an external radiator. In this manner, a denser charge of fuel may be admitted to the fuel tank.

However, the approach cited above requires extensive hardware and special materials dedicated exclusively to temperature management. The inventors herein have recognized this limitation and have provided a more elegant approach that may be implemented in a motor-vehicle fuel system having multiple compressed-gas fuel tanks. Further, the system may be integrated with a method for minimizing the mechanical work needed to refill a fuel system having multiple fuel tanks.

Therefore, in one embodiment, a method for distributing fuel in a fuel system of a motor vehicle is provided. The method may be applied in a fuel system having a first fuel tank, where fuel is confined at a first pressure, and a second fuel tank, where fuel is confined at a second pressure greater than the first pressure. The method comprises releasing fuel already resident in the second fuel tank to the first fuel tank, and admitting fuel to the first and second fuel tanks simultaneously. Other embodiments provide other, more particular methods for distributing fuel in a fuel system of a motor vehicle. In this manner, a more simply configured fuel system may be operated to accommodate a denser charge of fuel than might otherwise be possible.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

The subject matter of the present disclosure is now described by way of example and with reference to certain illustrated embodiments. Components that may be substantially the same in two or more embodiments are identified coordinately and are described with minimal repetition. It will be noted, however, that components identified coordinately in different embodiments of the present disclosure may be at least partly different. It will be further noted that the drawings included in this disclosure are schematic. Views of the illustrated embodiments are generally not drawn to scale; aspect ratios, feature size, and numbers of features may be purposely distorted to make selected features or relationships easier to see.

Figure 1:
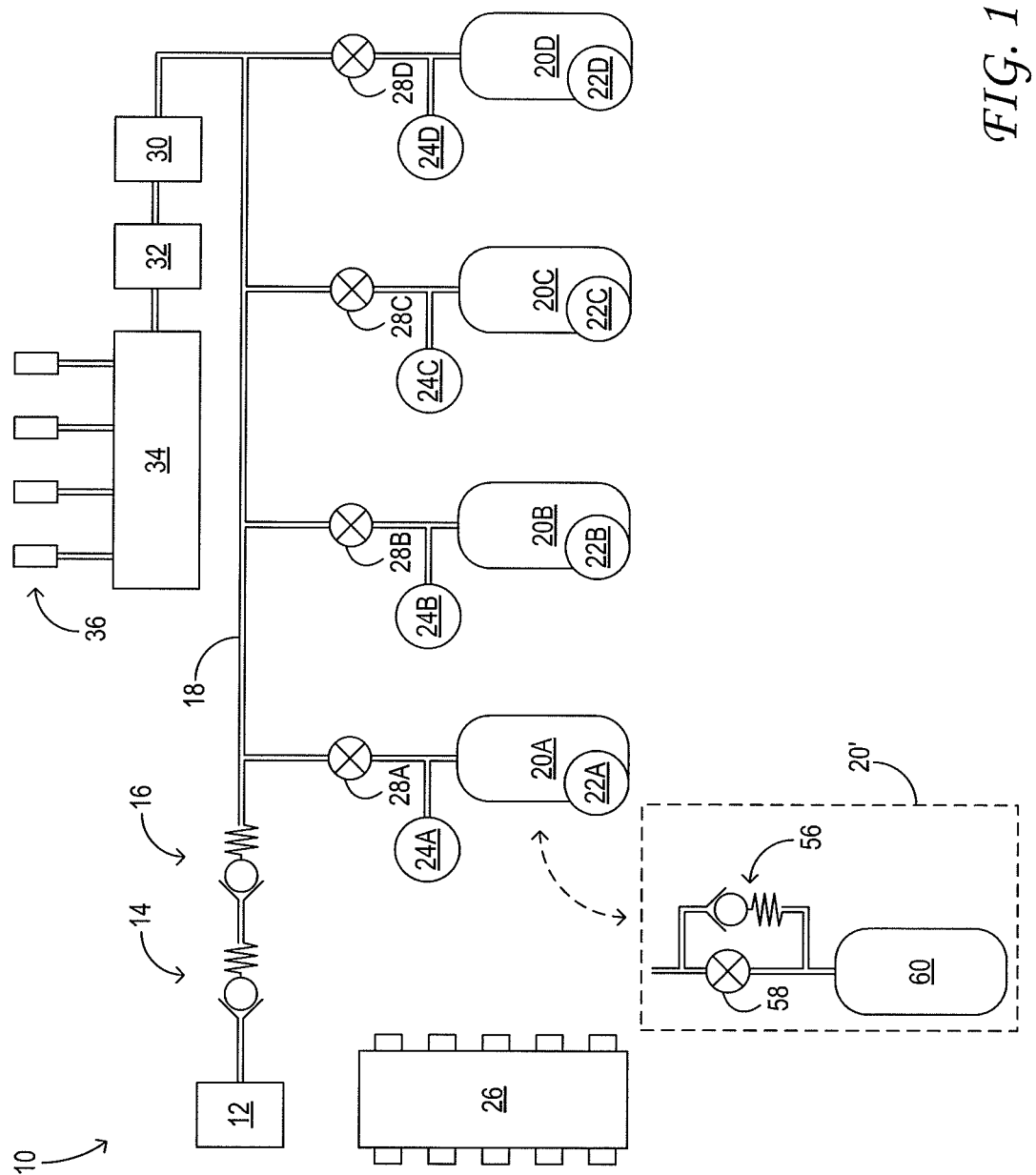
FIG. 1 schematically shows aspects of an example fuel system configured to distribute fuel among a plurality of fuel tanks in accordance with the present disclosure.

FIG. 1 schematically shows aspects of an example fuel system 10 configured to distribute fuel among a plurality of fuel tanks. The fuel system may be installed in a motor vehicle. In the illustrated embodiment, pressurized, gaseous fuel is admitted to the fuel system via fuel port 12. Accordingly, the fuel port may comprise one or more fixtures and/or fittings switchably couplable to a fuel supply line external to the fuel system. The fuel port may further comprise a closure that opens to admit one or more of a fuel and the supply line providing the fuel.

Industry standards may establish the type of fixture or fitting (viz., the configuration, dimensions, and/or materials thereof) through which one or more fuels may be supplied to fuel system 10 via fuel port 12. Industry standards may further establish an acceptable range of pressures at which one or more fuels are supplied to the fuel system. For example, hydrogen may be supplied at a pressure of approximately 5000 p.s.i., or CNG may be supplied at a pressure of approximately 3600 p.s.i. It will be understood that the supply pressures indicated herein are examples only, as other suitable pressures and pressure ranges are contemplated as well.

Continuing in FIG. 1, fuel system 10 includes check valves 14 and 16 arranged in series, downstream of fuel port 12, and leading to fuel line 18. The check valves prevent the pressurized fuel from escaping the fuel system when a closure of the fuel port is breeched. The check valves may also provide a predictable restriction against gas flow into the fuel system, such that a flow rate of fuel into the fuel system may be estimated based on a known supply pressure and a measured pressure of fuel in fuel line 18. In other embodiments, a flow sensor (not shown in the drawings) may be provided at the fuel port and configured to measure the flow rate of fuel into the fuel system.

Fuel system 10 further includes fuel tanks 20A, 20B, 20C, and 20D, configured to store pressurized, gaseous fuel. Fluidically coupled to each of the fuel tanks is a temperature sensor and a pressure sensor. Accordingly, temperature sensor 22A and pressure sensor 24A are fluidically coupled to fuel tank 20A, temperature sensor 22B and pressure sensor 24B are fluidically coupled to fuel tank 20B, etc. Each temperature sensor is responsive to the temperature of the gas inside the fuel tank to which it is coupled, and each pressure sensor is responsive to the pressure of a gas inside the fuel tank to which it is coupled—either a relative pressure measured with respect to atmosphere, or an absolute pressure measured with respect to vacuum. In the embodiment illustrated in FIG. 1, the pressure sensors and temperature sensors are operatively coupled to electronic control system 26, which may be any electronic control system of the fuel system or of the motor vehicle in which the fuel system is installed. Operatively coupled to the temperature and pressure sensors as described hereinabove, the electronic control system may be configured to estimate the amount of fuel contained in each fuel tank of the fuel system.

During refueling, each fuel tank in fuel system 10 may be charged via a normally closed control valve fluidically coupled to fuel line 18. During operation of the motor vehicle, each fuel tank may be discharged to the fuel line through the same control valve. Accordingly, control valve 28A is fluidically coupled to fuel tank 20A, control valve 28B is fluidically coupled to fuel tank 20B, etc. Further, control valves 28A-D may be operatively coupled to electronic control system 26 such that each of the control valves may be opened, closed, and/or adjusted in response to a signal from the electronic control system via appropriate valve actuators (not shown in the drawings).

From fuel line 18, fuel flows through filter 30 to pressure regulator 32. The pressure regulator is configured to maintain a substantially constant pressure of fuel in fuel rail 34, via which fuel is supplied to fuel injectors 36 of an engine. The filter is configured to protect the pressure regulator and fuel injectors from damage due to particulate solids entrained in the gas stream.

The embodiment illustrated in FIG. 1 enables active charging and discharging of fuel tanks 20A-D via the electronically controlled control valves fluidically coupled to each of the fuel tanks. Moreover, it enables the fuel pressures in two or more unequally filled fuel tanks to be rapidly pressure equilibrated by opening the control valves coupled to those tanks; this feature provides certain advantages, as set forth hereinafter.

Other embodiments fully consistent with the present disclosure may include more or fewer fuel tanks, more or fewer pressure sensors, an/or more or fewer temperature sensors. In one embodiment, for example, a single pressure sensor may be fluidically coupled to the fuel line, and the temperature sensor may be an ambient temperature sensor. In this embodiment, the electronic control system may be configured to estimate the temperature of the fuel in each of the fuel tanks based on the ambient temperature and on the history of fuel-line pressure variations and valve openings/closures recorded in the electronic control system as a function of time.

Figure 2:
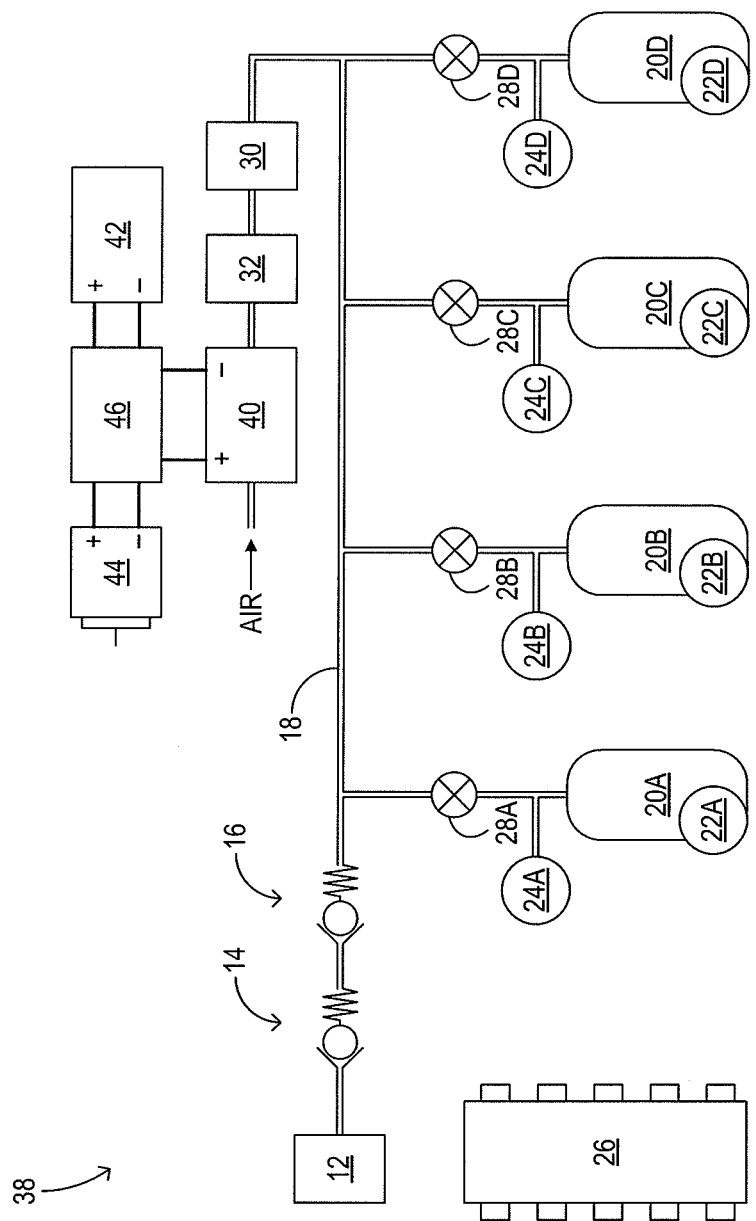
FIG. 2 schematically shows aspects of a second example fuel system configured to distribute fuel among a plurality of fuel tanks in accordance with the present disclosure.

FIG. 2 schematically shows aspects of a second example fuel system 38 configured to distribute fuel among a plurality of fuel tanks. The fuel system may be installed in an electric or hybrid motor vehicle, for example. In the embodiment illustrated in FIG. 2, pressure regulator 32 is coupled fluidically to an anode of fuel-cell 40, which admits air at the cathode. The electrical output of the fuel cell is provided to storage battery 42 and to motor 44 via power-routing network 46.

Figure 3:
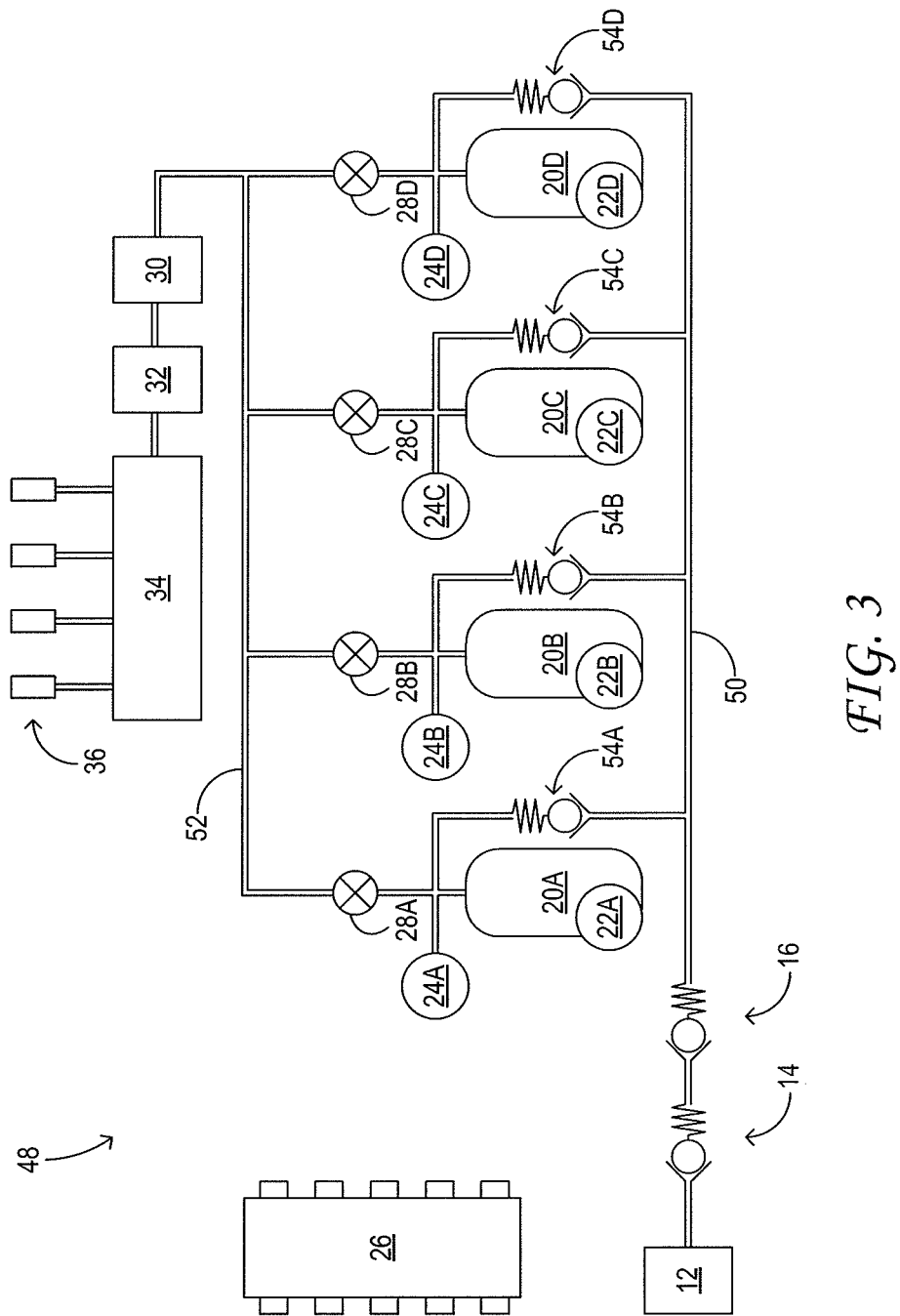
FIG. 3 schematically shows aspects of a third example fuel system configured to distribute fuel among a plurality of fuel tanks in accordance with the present disclosure.

FIG. 3 schematically shows aspects of a third example fuel system 48 configured to distribute fuel among a plurality of fuel tanks. Instead of a single fuel line conducting fuel from fuel port 12 and to pressure regulator 30, the embodiment illustrated in FIG. 3 includes fuel supply line 50 fluidically coupled to the fuel port via check valves 14 and 16, and fuel delivery line 52 fluidically coupled to the pressure regulator. In this embodiment, each fuel tank is fluidically coupled to the fuel delivery line via a control valve and to the fuel supply line via a check valve. Accordingly, check valve 54A is fluidically coupled to fuel tank 20A, check valve 54B is fluidically coupled to fuel tank 20B, etc. This embodiment enables active discharging and passive (e.g., unpowered) charging of fuel tanks 20A-D. In particular, it enables any fuel tank to be charged whenever the pressure in fuel supply line 50 is greater than the pressure in the fuel tank. Moreover, it enables the fuel pressures in two or more unequally filled fuel tanks to be rapidly equilibrated by opening the control valves coupled to those tanks.

The embodiments described above provide various advantages over existing motor-vehicle fuel systems in which a check valve is integrated in each of the control valves fluidically coupled to the fuel tanks. There, the integrated check valve may be coupled to both ends of the control valve and oriented to allow a fuel tank to fill whenever the pressure in the fuel line is greater than the pressure of the fuel tank. Fuel-tank assemblies including an integrated check valve and control valve are commercially available. One such fuel-tank assembly 20' is shown by example in FIG. 1. Fuel tank assembly 20' includes an integrated check valve 56 and an integrated, normally closed control valve 58 coupled in parallel to the outlet of fuel tank 60. In configurations that use such a fuel-tank assembly, normally closed control valve 58 may be operatively coupled to an electronic control system, such as electronic control system 26. It will be noted, however, that fuel tank assembly 20' would require an additional control valve in order to allow the fuel tanks to empty one at a time. The ability to empty the fuel tanks in sequence, rather than simultaneously, is used to an advantage in the example methods described hereinafter.

Nevertheless, it may be desirable—e.g., to reduce manufacturing cost—to use one or more commercially available fuel system assemblies to enact the various fuel-distribution approaches disclosed herein. For example, it may be desirable to use fuel tank assembly 20' in place of one or more of the fuel tanks in fuel system 10. If used in place of fuel tank 20A in fuel system 10, for instance, fuel tank assembly 20' could be discharged when control valves 28A and 58 are both open, and charged when control valve 28A is open, but control valve 58 is closed. Likewise, if used in place of fuel tank 20A in fuel system 48, fuel tank assembly 20' could be discharged when control valves 28A and 58 are both open, and charged whenever the pressure in fuel supply line 50 is greater than the pressure in fuel tank 60.

In still other another embodiments, control valves 28A-D in fuel system 10 may be normally open control valves. This variation will allow the fuel system to charge passively and discharge actively, substantially as described for fuel system 48.

The configurations illustrated above enable various methods for distributing fuel in a fuel system of a motor vehicle. Accordingly, some such methods are now described, by way of example, with continued reference to above configurations. It will be understood, however, that these methods, and others fully within the scope of the present disclosure, may be enabled via other configurations as well.

Figure 4:
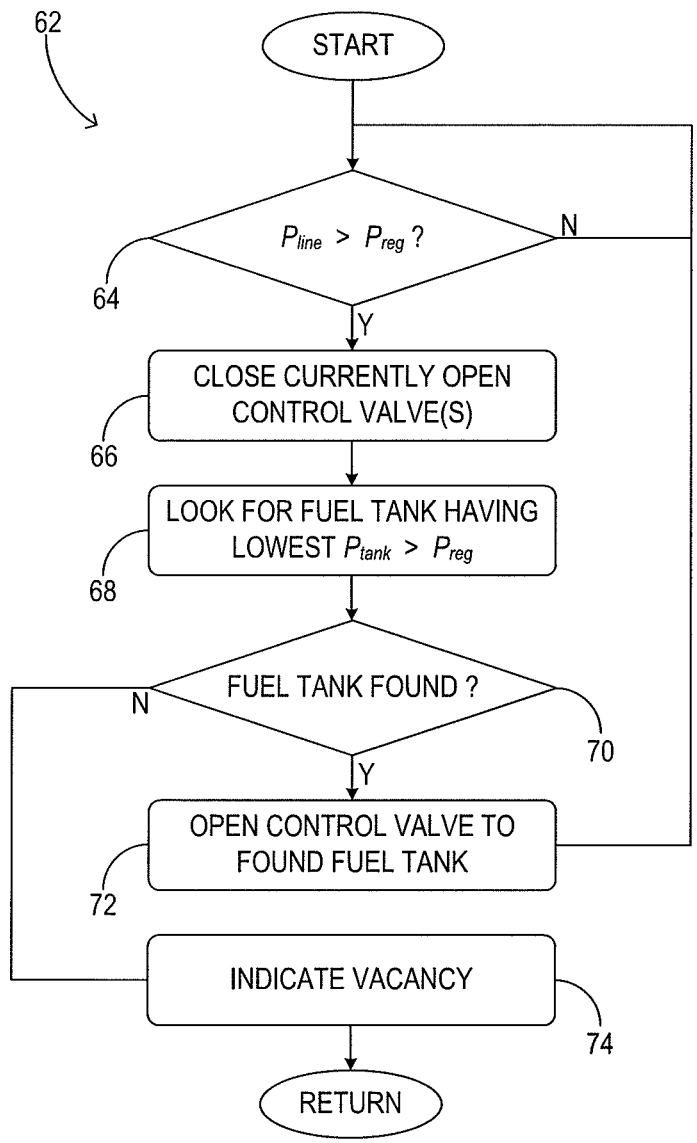
FIG. 4 illustrates an example method for distributing fuel in a fuel system of a motor vehicle in accordance with the present disclosure.

FIG. 4 illustrates an example method 62 for distributing fuel—hydrogen or compressed natural gas, for example—in a fuel system of a motor vehicle. Method 62 is a fuel-system discharging method; it may be enacted when the motor vehicle is operating and when the fuel system is delivering fuel to one or more fueled components of the motor vehicle—a fuel injector or fuel cell, for example. The method ensures inter alia that each fuel tank in the fuel system is depleted before fuel is drawn from the next fuel tank in sequence. In this manner, fuel-system entropy is kept as low as possible, which enables certain advantages, as described hereinafter.

Method 62 and subsequent methods include various computation, comparison, and decision-making actions, which may be enacted via an electronic control system (e.g., electronic control system 26) of the fuel system or of a motor vehicle in which the fuel system is installed. The methods further include various measuring and/or sensing actions that may be enacted via one or more sensors disposed in the fuel system (pressure sensors, temperature sensors, breech sensors, etc.)—operatively coupled to the electronic control system, as described in the example configurations hereinabove. The methods further include various valve-actuating events, which the electronic control system may enact in response to the various decision-making actions.

Method 62 may be entered upon when the fuel system is releasing fuel from one or more fuel tanks via one or more control valves (control valve 28A, for example) open to fuel line 18. The method begins at 64, where $P_{line}$, the pressure of fuel in fuel line 18, is compared to a set-point pressure $P_{reg}$ of pressure regulator 32. In embodiments where a pressure sensor is coupled directly to the fuel line, the electronic control system may determine $P_{line}$ directly. In other configurations, the electronic control system may determine or estimate $P_{line}$ indirectly. In one embodiment, $P_{line}$ may be calculated based on the output of a pressure sensor of a fuel tank that is open to the fuel line (one pressure sensors 24A-D, for example), and further based on a known flow rate through fuel injectors 36.

If it is determined that $P_{line}$ is significantly greater than $P_{reg}$, then method 62 returns to 64, where fuel continues to be released from the one or more fuel tanks currently open to the fuel line 18, and where the pressures are compared again. However, if it is determined that $P_{line}$ is not significantly greater than $P_{reg}$, then method 62 advances to 66.

At 66, all currently open control valves are closed, thereby preventing subsequent inflow of fuel to a depleted fuel tank when a fuller fuel tank opens to fuel line 18. Then, at 68, the electronic control system interrogates the fuel pressures of each fuel tank in the fuel system, attempting to identify a fuel tank having the lowest fuel pressure $P_{tank}$ that is greater than the set-point pressure $P_{reg}$. In fuel systems comprising a pressure sensor for each fuel tank, the fuel pressures may be interrogated simply by reading the response of each of the sensors. However, in embodiments where multiple fuel tanks share a common pressure sensor coupled to the fuel line or fuel-delivery line (viz., the high-pressure side of regulator 32), step 68 may comprise momentarily opening the control valves to each fuel tank in sequence to enable the common pressure sensor to sense the pressure in each fuel tank one at a time.

At 70, it is determined whether a fuel tank having a pressure greater than or equal to the set-point pressure can be found (i.e., identified) in the fuel system. If such a fuel tank is found, then at 72, the control valve linking the found fuel tank to the fuel line is open, allowing the fuel line to be sourced via the found fuel tank. In this manner, fuel is delivered from each fuel tank to a fueled component of the motor vehicle only after all other fuel tanks filled to a lesser pressure are depleted. Method 62 then returns to 64. However, if it is determined at 70 that no fuel tank can be found having $P_{tank} > P_{reg}$, then at 74, the electronic control system registers and indicates a vacant condition of the fuel system.

The present disclosure contemplates other fuel-system discharging methods as well. For example, in fuel-system configurations as shown in FIG. 3, steps 64 and 66 may be omitted. In these and similar embodiments, check valves 54A-D prevent fuel from the newly opened fuel tank from entering and partly refilling the emptied tanks, thereby preserving the ability to cool the fuel tanks on refill, as described below.

Figure 5:
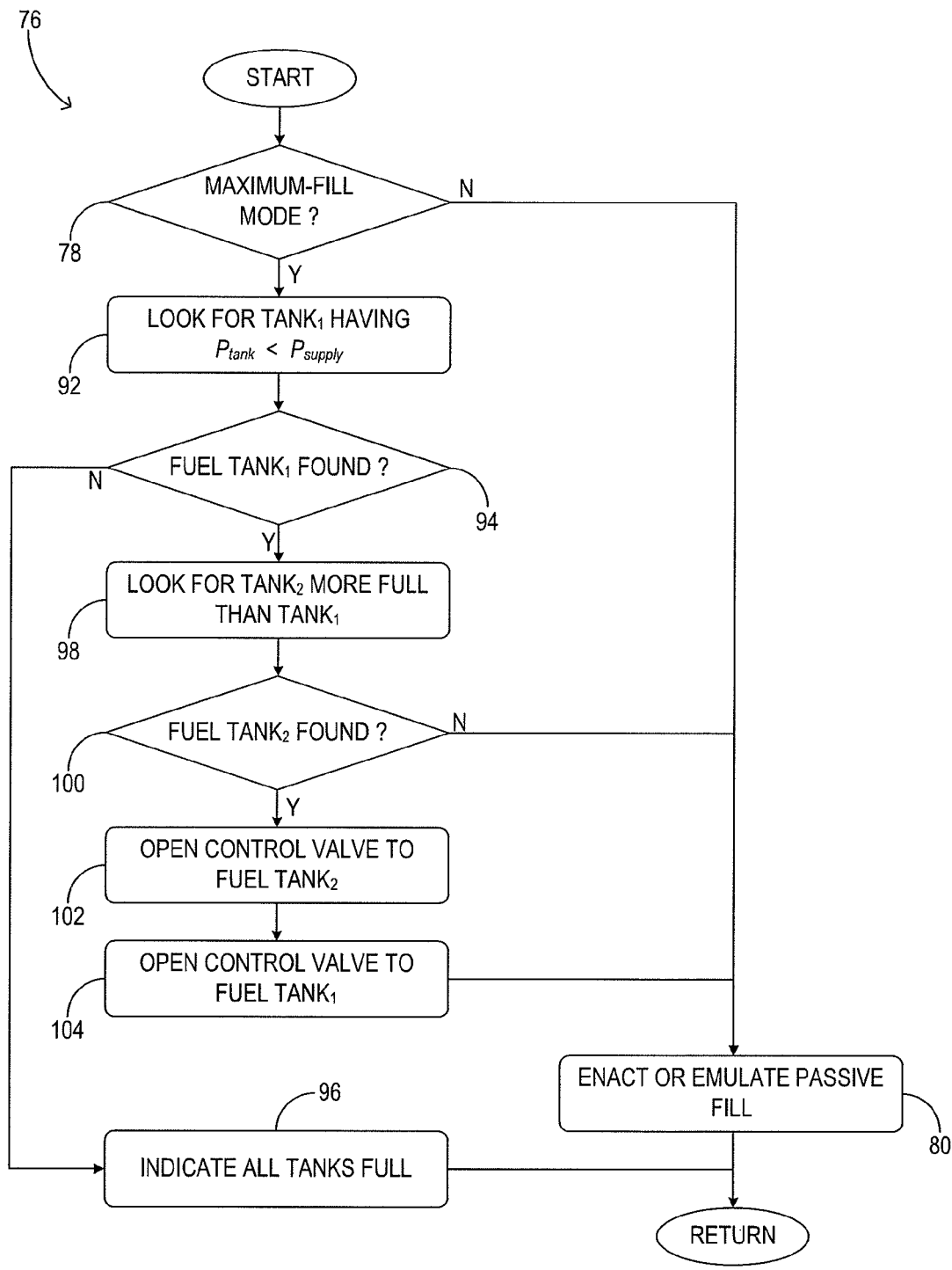
FIG. 5 illustrates another example method for distributing fuel in a fuel system of a motor vehicle in accordance with the present disclosure.

FIG. 5 illustrates another example method 76 for distributing fuel in a fuel system of a motor vehicle. Method 76 is a fuel-system refueling method; it may be enacted when the motor vehicle pulls into a filling station or home refilling appliance and a fuel-system refill is initiated.

Method 76 begins at 78, where the electronic control system determines which of at least two possible refueling modes is selected: an ECONOMY mode or a EXTENDED-FILL mode. A motor-vehicle operator or filling-station attendant may select the refueling mode in any suitable manner. Accordingly, the fuel system may be configured to communicate the selected refueling mode to the electronic control system. The refueling mode may be communicated, for example, via a fuel door key position or other mechanical switch. A precondition for both refueling modes is that the fuel tanks of the fuel system were not all discharged simultaneously prior to the execution of method 76, so that at least one fuel tank in the fuel system will be filled to a greater pressure than at least one other fuel tank. This precondition may be satisfied by any method that discharges the fuel tanks sequentially, such as method 62, for example.

In ECONOMY mode, the fuel tanks are filled so as to minimize the mechanical work needed to admit a given mass of fuel into the fuel system. This is accomplished by refilling the fuel tanks without first equalizing the pressures of the fuel tanks. In EXTENDED-FILL mode, the fuel tanks are filled so as to maximize the total mass of fuel that may be added to the one or more unfull fuel tanks of the fuel system. This may be accomplished by precooling two or more fuel tanks by allowing gas from a fuller fuel tank to expand into at least one emptier fuel tank. After the expansion stage, fuel is supplied to the two or more precooled fuel tanks simultaneously. Delivering a given mass of fuel to the two or more fuel tanks after the expansion stage requires more mechanical work and releases more heat than delivering the same mass of fuel in ECONOMY mode. After the fuel is delivered, however, the final temperature of the fuel delivered to the two or more fuel tanks will be lower than in ECONOMY mode because the temperature of the two or more fuel tanks immediately after the expansion stage may be quite low. Therefore, a greater mass of fuel may be accommodated when the fuel system is filled in EXTENDED-FILL mode rather than ECONOMY mode.

Continuing in FIG. 5, if EXTENDED-FILL mode has not been selected, then at 80, a passive fill of the fuel system is enacted or emulated. In a fuel system configured for passive refilling, such as the one shown in FIG. 3, fuel will flow into the lowest-pressure fuel tank first. This tank will continue to fill until its pressure approaches that of one or more other unfull fuel tanks in the fuel system. Thereafter, fuel tanks of substantially the same pressure will fill simultaneously, and so on, until all the tanks are all full or the refueling is terminated. This sequence minimizes the mechanical work used in filling the fuel tanks, and does so absent any active control of the fuel system.

Figure 6:
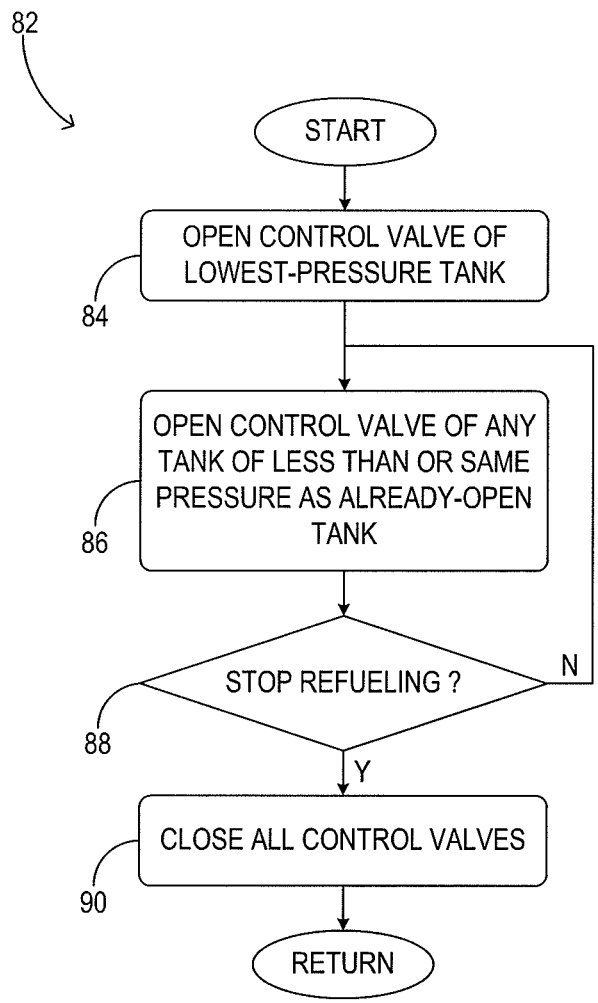
FIG. 6 illustrates an example method for emulating a passive refill of a fuel system of a motor vehicle in accordance with the present disclosure.

Other fuel-system configurations, such as the one shown in FIG. 1, for example, may be directed at 80 to emulate the passive refueling sequence described above. A method for emulating a passive refueling sequence is shown in FIG. 6 in one example embodiment.

Method 82 begins at 84, where the control valve coupled to the lowest-pressure fuel tank is opened. The method then advances to 86, where one or more fuel tanks are identified whose pressures are less than or equal to the pressure of the fuel tank being filled. Control valves coupled to any such fuel tanks are then opened. The method then advances to 88, where it is determined whether to stop the refueling. The determination at 88 may be made automatically, based on whether the refill is complete (e.g., all control valves are open, and the pressure in the fuel line is approaching the supply pressure) or in response to a termination instruction from the motor-vehicle operator or filling station attendant. If it is determined not to stop the refueling, then the method returns to 86. Otherwise, the method advances to 90, where the control valves coupled to all fuel tanks in the fuel system are closed. Method 82 then returns.

Returning now to FIG. 5, if it is determined at 78 that EXTENDED-FILL mode is selected, then at 92, the electronic control system interrogates the fuel pressures of each fuel tank in the fuel system, attempting to identify a fuel tank having a lower fuel pressure $P_{tank}$ than $P_{supply}$, the pressure of fuel supplied to the fuel system via the external supply line. In some embodiments, $P_{supply}$ may be an industry-standard, constant value: 3600 p.s.i. for CNG, 5000 p.s.i. for hydrogen, etc. In other embodiments, $P_{supply}$ may vary from one fuel distribution facility to the next. In these and other embodiments, the determination at 92 may be based on a response of a flow sensor fluidically coupled to fuel port 12. Accordingly, a positive flow into the fuel system may be used as an indication that $P_{line}$ is less than $P_{supply}$. At 94, it is determined whether such a fuel tank can be found in the fuel system. If no such fuel tank can be found, i.e., if every fuel tank is full, then at 96, the electronic control system registers and indicates a full condition of the fuel system. However, if at least one fuel tank is found having $P_{tank} < P_{supply}$, then the electronic control system selects it as $TANK_1$. Accordingly, $TANK_1$ may be selected from among a plurality of unfull fuel tanks based on the fuel pressures of each unfull fuel tank in the fuel system.

If a suitable $TANK_1$ is found, then method 76 advances to 98, where the electronic control system interrogates the fuel pressures of each fuel tank in the fuel system, attempting to identify a fuel tank of greater pressure than $TANK_1$. At 100, it is determined whether such a fuel tank can be found in the fuel system. If no such fuel tank can be found, then the expansion stage referred to above may not be possible, and the method advances to 80, as in ECONOMY MODE. However, if it is determined that one or more fuel tanks having higher pressure than $TANK_1$ are available, then the electronic control system selects $TANK_2$ from among them. At 102, the control valve linking $TANK_2$ to fuel line 18 is opened. Accordingly, $TANK_2$ is selected from among the plurality of fuel tanks in the fuel system based on a fuel pressure of each fuel tank.

In other embodiments, $TANK_2$ may be selected based on a fuel temperature instead of or in addition to the fuel pressure of each fuel tank in the fuel system. In particular, $TANK_2$ may be chosen so that releasing fuel already resident in $TANK_2$ into $TANK_1$ provides a cooler temperature in $TANK_1$ than releasing fuel already resident in any other fuel tank into $TANK_1$. In still other embodiments, the determination of which fuel tank to select may be based on calculations or numerical simulations enacted in the electronic control system based on theoretical enthalpies for adiabatic expansion and/or adiabatic compression of the fuel.

Continuing in FIG. 5, method 76 then advances to 104, where the control valve linking $TANK_1$ to fuel line 18 is open. Thus, releasing fuel already resident in $TANK_2$ into $TANK_1$ may comprise opening the control valves fluidically coupled to both fuel tanks, allowing fuel already resident in $TANK_2$ to rapidly expand into both fuel tanks. Further, the fuel may expand quickly enough so that very little heat is absorbed from the conduits and walls of the fuel tanks during the expansion, i.e., the expansion may occur substantially adiabatically. As a result, the temperature of the fuel in $TANK_1$ and $TANK_2$ may be significantly reduced relative to ambient temperatures. During and/or after the rapid expansion, fuel from fuel port 12 flows into fuel line 18 and is admitted to both fuel tanks simultaneously. In one embodiment, fuel may be admitted to $TANK_1$ and $TANK_2$ beginning after the expansion stage is finished. In another embodiment, the expansion stage may occur while fuel is being admitted to $TANK_1$ and $TANK_2$. In either case, admitting fuel simultaneously into $TANK_1$ and $TANK_2$ may comprise flowing the fuel into $TANK_1$ via a control valve coupled to $TANK_1$ and into $TANK_2$ via a control valve coupled to $TANK_2$.

In other embodiments fully consistent with this disclosure, $TANK_2$ may be one of a plurality of fuel tanks from which fuel already resident in the fuel system is released to $TANK_1$ prior to admitting the fuel to $TANK_1$ and $TANK_2$ simultaneously. Further, $TANK_1$ may be one of a plurality of fuel tanks into which fuel already resident in the fuel system is released from the $TANK_2$ prior to admitting the fuel to $TANK_1$ and $TANK_2$ simultaneously. Further still, the particular groups of tanks chosen in these cases may be based on which would ultimately enable the greatest mass of fuel to be accommodated in the fuel system during a subsequent or contemporaneous refill. This, in turn, may be based on the current fill state of each fuel tank and the predicted level of cooling for each fuel tank during an adiabatic expansion in several possible scenarios. Accordingly, electronic control system 26 may be configured to estimate the mass of fuel that could be accommodated under numerous possible equilibration/refilling scenarios, based on these considerations, and then select the scenario that accommodates the maximum total mass of fuel.

Continuing in FIG. 5, method 76 advances from 104 to 80, where a passive fill is enacted or emulated, as described hereinabove. Following this action, the method returns. It will be understood that the methods set forth hereinabove are examples only, and that numerous other methods are within the spirit and scope of this disclosure. Some such methods may have the same or greater complexity, while others may be simpler. For instance, one method may comprise, during EXTENDED-FILL mode, simply opening all of the fuel-tank control valves simultaneously to equalize the fuel pressure just before the refill event. After the fuel-tank pressures are equalized, refilling may be enacted passively, for example. In yet another example, a staged refill may be enacted, wherein two or more fuel tanks in a first group are chosen as described above for a first stage of pressure equalization, then after pressure equalization and a subsequent partial refueling, a second group may be chosen for a second stage of pressure equalization and continued refueling. In some embodiments, the second stage may be enacted as soon as the first stage is complete, while in other embodiments, the first and second stages may be separated by any suitable period of time.

It will be further understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system. It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method for distributing fuel in a fuel system of a motor vehicle, the fuel system having a first fuel tank, where fuel is confined at a first pressure, and a second fuel tank, where fuel is confined at a second pressure greater than the first pressure, the method comprising:
   releasing fuel already resident in the second fuel tank to the first fuel tank; and
   admitting fuel to the first and second fuel tanks simultaneously.

2. The method of claim 1, wherein admitting fuel to the first and second fuel tanks simultaneously begins after said releasing is finished.

3. The method of claim 1, wherein said releasing occurs while admitting fuel to the first and second fuel tanks simultaneously.

4. The method of claim 1, where said releasing and said admitting occur during a first refueling mode of the fuel system, the method further comprising, during a second refueling mode of the fuel system, admitting fuel to the first fuel tank while no fuel is admitted to the second fuel tank.

5. The method of claim 1, further comprising delivering fuel from the first fuel tank to a fueled component of the motor vehicle, and, delivering fuel from the second fuel tank to a fueled component of the motor vehicle after the fuel in the first fuel tank is depleted.

6. The method of claim 5, wherein the fueled component of the motor vehicle is a fuel injector disposed in an engine of the motor vehicle.

7. The method of claim 5, wherein the fueled component of the motor vehicle is a fuel cell.

8. The method of claim 1, wherein the second fuel tank is one of a plurality of fuel tanks from which fuel already resident in the fuel system is released to the first fuel tank prior to admitting the fuel to the first and second fuel tanks simultaneously.

9. The method of claim 1, wherein the first fuel tank is one of a plurality of fuel tanks to which the fuel already resident in the fuel system is released from the second fuel tank prior to admitting the fuel to the first and second fuel tanks simultaneously.

10. The method of claim 1, wherein a fuel line of the motor vehicle is fluidically coupled to the first fuel tank via a first control valve and to the second fuel tank via a second control valve, and where releasing fuel already resident in the second fuel tank to the first fuel tank comprises opening the first and second control valves.

11. The method of claim 10, wherein admitting fuel to the first and second fuel tanks simultaneously comprises flowing the fuel into the first fuel tank via the first control valve and into the second fuel tank via the second control valve.

12. The method of claim 11, further comprising closing at least the first control valve when a pressure of fuel in the fuel line approaches a supply pressure of the fuel.

13. The method of claim 1, wherein releasing fuel already resident in the second fuel tank to the first fuel tank is enacted substantially adiabatically.

14. A method for refueling a fuel system of a motor vehicle, the fuel system having a plurality of fuel tanks, the method comprising:
   selecting an unfull first fuel tank from among the plurality of fuel tanks;
   during a first refueling mode of the fuel system, admitting fuel to the unfull first fuel tank only;
   during a second refueling mode of the fuel system:
      selecting from among the plurality of fuel tanks a second fuel tank having a greater pressure than the unfull first fuel tank;
      releasing fuel already resident in the second fuel tank to the unfull first fuel tank; and
      admitting fuel to the second and unfull first fuel tanks simultaneously.

15. The method of claim 14, wherein the unfull first fuel tank is among a plurality of unfull fuel tanks selected in sequence based on the fuel pressures of each unfull fuel tank in the plurality of unfull fuel tanks.

16. The method of claim 14, wherein the second fuel tank is selected from among the plurality of fuel tanks based on at least one of a fuel pressure and a fuel temperature of each fuel tank in the plurality of fuel tanks.

17. The method of claim 16, wherein releasing fuel already resident in the second fuel tank to the unfull first fuel tank provides a cooler temperature in the unfull first fuel tank than releasing fuel already resident in any other fuel tank in the plurality of fuel tanks to the unfull first fuel tank.

18. The method of claim 13, wherein the fuel comprises compressed natural gas.

19. The method of claim 13, wherein the fuel comprises hydrogen.

20. A method for refueling a fuel system of a motor vehicle with compressed natural gas, the fuel system having a plurality of fuel tanks, the method comprising:
   selecting an unfull first fuel tank from among the plurality of fuel tanks;
   during a first refueling mode of the fuel system, opening a first control valve to admit compressed natural gas to the unfull first fuel tank only;
   during a second refueling mode of the fuel system:

selecting from among the plurality of fuel tanks a second fuel tank having a pressure of compressed natural gas greater than that of the unfull first fuel tank;

opening the first control valve and a second control valve to release compressed natural gas already resident in the second fuel tank to the unfull first fuel tank; and admitting fuel to the second and unfull first fuel tanks simultaneously.

\* \* \* \* \*